United States Patent
Suzuki et al.

(10) Patent No.: US 11,913,411 B2
(45) Date of Patent: Feb. 27, 2024

(54) INTERNAL COMBUSTION ENGINE

(71) Applicant: TOYOTA JIDOSHA KABUSHIKI KAISHA, Aichi-ken (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/193,642

(22) Filed: Mar. 31, 2023

(65) Prior Publication Data
US 2023/0313761 A1  Oct. 5, 2023

(30) Foreign Application Priority Data
Apr. 5, 2022  (JP) .................. 2022-062977

(51) Int. Cl.
*F02M 25/00* (2006.01)
*F02M 25/022* (2006.01)
*F02M 25/028* (2006.01)
*F02M 25/03* (2006.01)

(52) U.S. Cl.
CPC ...... *F02M 25/0225* (2013.01); *F02M 25/028* (2013.01); *F02M 25/03* (2013.01)

(58) Field of Classification Search
CPC .. F02M 25/0225; F02M 25/028; F02M 25/03; F02M 25/0227; F02M 35/1038; F02D 41/0065
See application file for complete search history.

(56) References Cited

U.S. PATENT DOCUMENTS

| | | | | |
|---|---|---|---|---|
| 4,558,665 | A | * 12/1985 | Sandberg | ........... F02M 25/0225 123/25 J |
| 9,945,310 | B1 | * 4/2018 | McQuillen | ........... F02M 35/104 |
| 2018/0171936 | A1 | * 6/2018 | McQuillen | ......... F02M 25/0227 |

FOREIGN PATENT DOCUMENTS

| | | |
|---|---|---|
| JP | H9112354 A | 4/1997 |
| JP | 2009138661 A | 6/2009 |
| JP | 2021011824 A * | 2/2021 |

* cited by examiner

*Primary Examiner* — Syed O Hasan
(74) *Attorney, Agent, or Firm* — HAUPTMAN HAM, LLP

(57) ABSTRACT

An internal combustion engine includes an asynchronous injection valve configured to inject water into an intake port when one or more intake valves are closed and a synchronous injection valve configured to inject water into the intake port when the one or more intake valves are open. The asynchronous injection valve and the synchronous injection valve are configured to have injection characteristics that are different between the asynchronous injection valve and the synchronous injection valve.

7 Claims, 2 Drawing Sheets

INTERNAL COMBUSTION ENGINE

RELATED APPLICATIONS

The present application claims priority of Japanese Patent Application No. 2022-062977 filed Apr. 5, 2022, the disclosure of which is hereby incorporated by reference herein in its entirety.

BACKGROUND

1. Field

The following description relates to an internal combustion engine in which water is injected into an intake port.

2. Description of Related Art

Japanese Laid-Open Patent Publication No. 2009-138661 discloses an internal combustion engine in which water injection is performed. Such an internal combustion engine is used for, for example, an internal combustion engine in motorsports. In the internal combustion engine, injected water is vaporized to cool intake air.

In the internal combustion engine in which water injection is performed as described above, some of the injected water may collect on the wall surface of an intake port or the wall surface of a cylinder. The effect of evaporative cooling is reduced by the amount of water collecting on the wall surface. Further, when a large quantity of water collects on the wall surface of the intake port or the wall surface of the cylinder, the water may be mixed with engine oil. The water mixed with the engine oil may cloud the engine oil or is vaporized inside a crankcase thereby increasing the internal pressure of the crankcase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an internal combustion engine includes a cylinder, an intake port coupled to the cylinder, one or more intake valves configured to selectively allow and block connection of the intake port to the cylinder, an asynchronous injection valve configured to inject water into the intake port when the one or more intake valves are closed, and a synchronous injection valve configured to inject water into the intake port when the one or more intake valves are open. The asynchronous injection valve and the synchronous injection valve are configured to have injection characteristics that are different between the asynchronous injection valve and the synchronous injection valve.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An internal combustion engine 10 according to one embodiment will now be described with reference to FIGS. 1 to 4. The internal combustion engine 10 of the present embodiment is a hydrogen engine that runs on hydrogen gas.

Structure of Internal Combustion Engine 10

Figure 1:
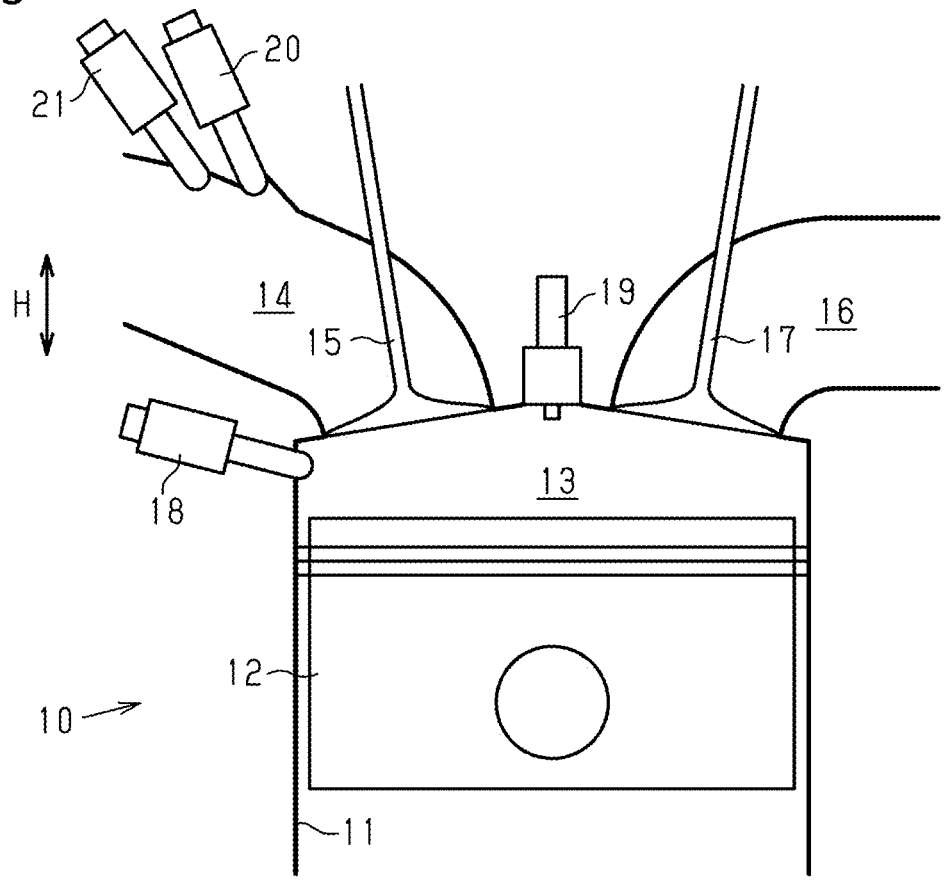
FIG. 1 is a drawing schematically showing the structure of a cylinder of an internal combustion engine according to one embodiment.

As shown in FIG. 1, the internal combustion engine 10 includes at least one cylinder 11. The cylinder 11 includes a piston 12 arranged in a reciprocal manner. Inside the cylinder 11, the piston 12 defines a combustion chamber 13 in which an air-fuel mixture is burned. An intake port 14, which is an intake passage through which intake air is drawn into the cylinder 11, is coupled to the cylinder 11 by one or more intake valves 15. The intake valves 15 selectively allow and block the connection of the intake port 14 to the cylinder 11. An exhaust port 16, which is a discharge passage through which exhaust gas is discharged from the cylinder 11, is coupled to the cylinder 11 by one or more exhaust valves 17. The exhaust valves 17 selectively allow and block the connection of the exhaust port 16 to the cylinder 11. The cylinder 11 includes a hydrogen gas injection valve 18 that injects hydrogen gas into the cylinder 11 and a spark plug 19 that ignites an air-fuel mixture of hydrogen gas and intake air with a spark discharge. In the following description, a direction of the intake port 14 that extends in the direction in which the piston 12 is operated inside the cylinder 11 is referred to as a height direction H of the intake port 14. Further, one side of the height direction H of the intake port 14 that has a greater distance from the cylinder 11 is referred to as an upper side of the intake port 14, and another side of the height direction H that has a smaller distance from the cylinder 11 is referred to as a lower side of the intake port 14.

Figure 2:
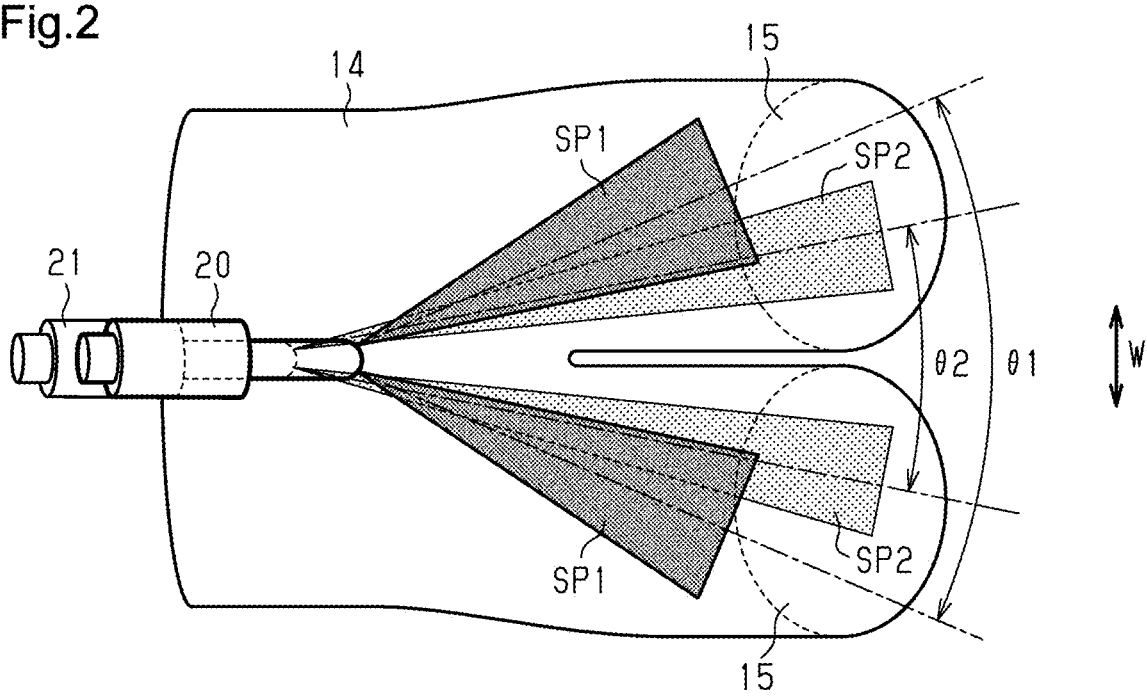
FIG. 2 is a drawing showing a planar structure of an intake port of the internal combustion engine of FIG. 1.

As shown in FIG. 2, a portion of the intake port 14 is branched into two paths at the downstream side of an intake air flowing direction. The intake port 14 is coupled to the cylinder 11 by two intake valves 15 for the corresponding two branched paths. In the following description, a direction of the intake port 14 that extends in the direction in which the two intake valves 15 are arranged is referred to as a width direction W of the intake port 14.

The internal combustion engine 10 includes two water injection valves that are an asynchronous injection valve 20 and a synchronous injection valve 21 per cylinder 11. The asynchronous injection valve 20 is a water injection valve used for asynchronous injection that injects water into the intake port 14 when the intake valves 15 are closed. The synchronous injection valve 21 is a water injection valve used for synchronous injection that injects water into the intake port 14 when the intake valves 15 are open. FIG. 2 shows sprays SP1 of water injected by the asynchronous injection valve 20 and sprays SP2 of water injected by the synchronous injection valve 21. The asynchronous injection valve 20 and the synchronous injection valve 21 are arranged next to each other in the height direction H at the central position in the width direction W of the intake port 14. In the internal combustion engine 10 of the present embodiment, the asynchronous injection valve and the synchronous injection valve 21 are arranged at the upper side of the intake port 14.

Figure 3:
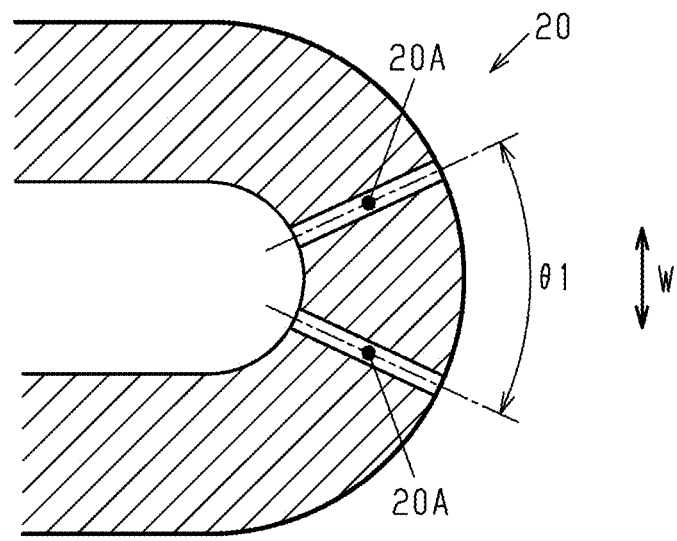
FIG. 3 is a cross-sectional view of a nozzle tip of an asynchronous injection valve of the internal combustion engine of FIG. 1.
Figure 4:
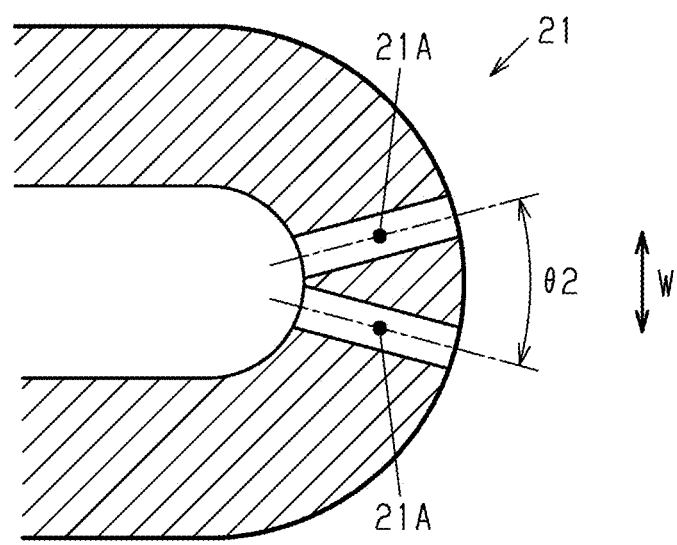
FIG. 4 is a cross-sectional view of a nozzle tip of a synchronous injection valve of the internal combustion engine of FIG. 1.

FIG. 3 shows a cross-sectional structure of the nozzle tip of the asynchronous injection valve 20. FIG. 4 shows a cross-sectional structure of the nozzle tip of the synchronous injection valve. The asynchronous injection valve 20 includes two nozzle holes 20A. The synchronous injection valve 21 includes two nozzle holes 21A. An angle θ1 between the two nozzle holes 20A of the asynchronous injection valve 20 is greater than an angle θ2 between the two nozzle holes 21A of the synchronous injection valve 21. The asynchronous injection valve 20 and the synchronous injection valve 21 are arranged in the internal combustion engine 10 so that sprays of water injected from the two nozzle holes 21A are directed toward the two branched paths of the intake port 14. The asynchronous injection valve 20 is configured to inject water at a wider angle than the synchronous injection valve 21 in the width direction W of the intake port 14.

The nozzle holes 20A of the asynchronous injection valve 20 each have a smaller diameter than the nozzle holes 21A of the synchronous injection valve 21. In other words, the asynchronous injection valve 20 includes smaller nozzle holes 20A than the nozzle holes 21A of the synchronous injection valve 21. The asynchronous injection valve 20 and the synchronous injection valve 21 have the same water injection pressure. That is, the asynchronous injection valve 20 is configured to inject water at a lower injection rate than the synchronous injection valve 21. The injection rate refers to the amount of water injected per unit time. A smaller nozzle hole is more likely to atomize spray when injecting water.

Operation and Advantages of Embodiment

The internal combustion engine 10 injects water into the intake port 14 from the asynchronous injection valve 20 and the synchronous injection valve 21 in accordance with the operation state. In the internal combustion engine 10, water injection is adjusted by switching between asynchronous injection and synchronous injection in accordance with the operation state of the internal combustion engine 10 and the amount of water that is to be injected. The asynchronous injection is water injection that is performed when the intake valves 15 are closed. The synchronous injection is water injection that is performed when the intake valves 15 are open. In the internal combustion engine 10, the asynchronous injection valve 20 performs the asynchronous injection and the synchronous injection valve 21 performs the synchronous injection.

Some of the water injected into the intake port 14 may collect on the wall surface of the intake port 14 or the surface of the intake valve 15 without being vaporized. In the following description, the amount of water collecting on the wall surface of the intake port 14 or the surface of the intake valve 15 is referred to as the amount of port wall wetting. During the synchronous injection, injected water may enter the cylinder 11 together with intake air and collect on the wall surface of the cylinder 11. In the following description, the amount of water collecting on the wall surface of the cylinder 11 is referred to as the amount of liner wall wetting.

During the asynchronous injection, the intake valves 15 are closed and the flow of intake air is stagnant inside the intake port 14. In contrast, during the synchronous injection, the intake valves 15 are open and intake air flows toward the cylinder 11 inside the intake port 14. When water is injected at a relatively low injection rate, spray is more atomized and diffused than when water is injected at a relatively high injection rate. Thus, during the asynchronous injection in which the flow of the intake air is stagnant inside the intake port 14, an increase in the amount of port wall wetting is limited by injecting water at a relatively low injection rate. The period during which the intake valves 15 are open is shorter than the period during which the intake valves 15 are closed. Thus, the synchronous injection has less time allowing for water injection than the asynchronous injection. This may restrict the amount of water that can be injected when the synchronous injection is performed at a relatively low injection rate. However, during the synchronous injection in which intake air flows inside the intake port 14, even when water is injected at a relatively high injection rate, spray is atomized in an airflow and an increase in the amount of port wall wetting is limited. Thus, it is desirable that the asynchronous injection be performed at a relatively low injection rate and the synchronous injection be performed at a relatively high injection rate.

In the intake port 14 when the intake valves 15 are open, the flow of intake air is stronger at outer portions in the width direction than at a central portion in the width direction. With respect to the synchronous injection, when water is injected toward the outer portions in the width direction of the intake port 14, the injected water is conveyed in a strong airflow and enters the cylinder 11, which is likely to increase the amount of liner wall wetting. Thus, during the synchronous injection, it is desirable that water injection be performed at a narrow angle in the width direction W to reduce the amount of spray that reaches the outer portions in the width direction of the intake port 14. In contrast, during the asynchronous injection in which the intake valves 15 are closed, it is desirable that water be injected at a relatively wide angle to diffuse spray in a wide range so as to limit an increase in the amount of port wall wetting.

The asynchronous injection valve 20 of the internal combustion engine 10 is configured to inject water at a lower injection rate than the synchronous injection valve 21. Further, the asynchronous injection valve 20 is configured to inject water at a wider angle than the synchronous injection valve 21 in the width direction W of the intake port 14. This limits an increase in the amount of port wall wetting and the amount of liner wall wetting.

The internal combustion engine 10 of the present embodiment has the following advantages.

(1) An airflow in the intake port 14 has different states between when the intake valves 15 are closed and when the intake valves 15 are open. Thus, injection characteristics for the asynchronous injection that are set to limit an increase in the amount of port wall wetting may increase the amount of liner wall wetting when the synchronous injection is performed. The internal combustion engine 10 of the present embodiment includes two water injection valves with different injection characteristics per cylinder 11: the asynchronous injection valve 20 that performs the asynchronous injection of water into the intake port 14 and the synchronous injection valve 21 that performs the synchronous injection of water into the intake port 14. Thus, the asynchronous injection and the synchronous injection are both performed with corresponding injection characteristics that are appropriate to limit port wet and liner wet.

(2) The asynchronous injection valve 20 is configured to inject water at a lower injection rate than the synchronous injection valve 21. The asynchronous injection performed at a relatively low injection rate accelerates atomization and diffusion of spray so as to limit an increase in the amount of port wall wetting during the asynchronous injection, in which the flow of intake air is stagnant inside the intake port 14. In contrast, the synchronous injection, which has less injection time than the asynchronous injection, is performed at a relatively high injection rate so as to ensure the amount of water injection. In the synchronous injection, spray is atomized in an airflow inside the intake port 14 and the amount of port wall wetting is less likely to increase even when water injection is performed at a relatively high injection rate. Thus, the asynchronous injection and the synchronous injection both limit the amount of port wall wetting while minimizing the restriction on the amount of water injection.

(3) The asynchronous injection valve 20 is configured to include the nozzle holes 20A, which are smaller than the nozzle holes 21A of the synchronous injection valve 21. Thus, the asynchronous injection valve 20 is configured to inject water at a lower injection rate than the synchronous injection valve 21 without changing the water injection pressure between the asynchronous injection valve 20 and the synchronous injection valve 21.

(4) During the synchronous injection, an airflow becomes relatively strong at the outer portions in the width direction of the intake port 14. Thus, an increase in the amount of liner wall wetting is limited when water is injected at a relatively narrow angle. In contrast, during the asynchronous injection in which a flow of intake air is stagnant inside the intake port 14, the amount of port wall wetting is limited when water is injected at a relatively wide angle to diffuse spray. In this regard, in the internal combustion engine 10 of the present embodiment, the asynchronous injection valve 20 is configured to inject water at a wider angle than the synchronous injection valve 21 in the width direction W of the intake port 14. This limits an increase in the amount of port wall wetting during the asynchronous injection and an increase in the amount of liner wall wetting during the synchronous injection.

(5) The limitation on the amount of port wall wetting and the amount of liner wall wetting minimizes mixture of water with engine oil. This limits clouding of the engine oil and vaporization of water in the engine oil inside the crankcase that may lead to an increase in the internal pressure of the crankcase.

(6) To inject water equally to each of the two branched paths of the intake port 14, it is desirable that water injection valves be arranged at the central position in the width direction W of the intake port 14. In this regard, in the internal combustion engine 10 of the present embodiment, the asynchronous injection valve 20 and the synchronous injection valve 21 are arranged next to each other in the height direction H of the intake port 14. Thus, the asynchronous injection valve 20 and the synchronous injection valve 21 are both arranged at the central position in the width direction W of the intake port 14. This injects water equally to each of the two branched paths of the intake port 14 in the asynchronous injection and the synchronous injection.

The present embodiment may be modified as described below. The present embodiment and the following modifications can be combined as long as the combined modifications remain technically consistent with each other.

One or both of the asynchronous injection valve 20 and the synchronous injection valve 21 may be arranged at the lower side of the intake port 14.

The asynchronous injection valve 20 and the synchronous injection valve 21 may be arranged next to each other in the width direction W of the intake port 14.

The water injection pressure of the asynchronous injection valve 20 may be lower than that of the synchronous injection valve 21 so that the injection rate of the asynchronous injection valve 20 is lower than the synchronous injection valve 21. In this case, the injection rate of the asynchronous injection valve 20 can be lower than the synchronous injection valve 21 without reducing the nozzle holes 20A of the asynchronous injection valve 20 in size as compared with the nozzle holes 21A of the synchronous injection valve 21.

The asynchronous injection valve 20 and the synchronous injection valve 21 may each include one nozzle hole or three or more nozzle holes. The number of nozzle holes of the asynchronous injection valve 20 may differ from the number of nozzle holes 21A of the synchronous injection valve 21.

The asynchronous injection valve 20 of the above embodiment is configured to: (A) inject water at a lower injection rate than the synchronous injection valve 21 and (B) inject water at a wider angle than the synchronous injection valve 21 in the width direction W of the intake port 14. Instead, the asynchronous injection valve 20 may be configured to implement only one of (A) and (B). In this case, the asynchronous injection valve 20 will have one of the advantages described in (2) and (4) above.

The water injection system in the internal combustion engine 10 of the above embodiment can be applied to an internal combustion engine in addition to a hydrogen gas engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An internal combustion engine, comprising:
a cylinder;
an intake port coupled to the cylinder;

one or more intake valves configured to selectively allow and block connection of the intake port to the cylinder;

an asynchronous injection valve configured to inject water into the intake port when the one or more intake valves are closed; and a synchronous injection valve configured to inject water into the intake port when the one or more intake valves are open, wherein the asynchronous injection valve and the synchronous injection valve are configured to have injection characteristics that are different between the asynchronous injection valve and the synchronous injection valve, the one or more intake valves are two intake valves, the intake port is coupled to the cylinder by the two intake valves, the intake port has a width direction that extends in a direction in which the two intake valves are arranged, and the asynchronous injection valve is configured to inject water at a wider angle than the synchronous injection valve in the width direction of the intake port.

2. The internal combustion engine according to claim 1, wherein the asynchronous injection valve is configured to inject water at a lower injection rate than the synchronous injection valve.

3. The internal combustion engine according to claim 1, wherein the asynchronous injection valve includes a nozzle hole, the synchronous injection valve includes a nozzle hole, and the nozzle hole of the asynchronous injection valve is smaller than the nozzle hole of the synchronous injection valve.

4. The internal combustion engine according to claim 1, wherein the intake port has a height direction that extends in a direction in which a piston is operated inside the cylinder, and the asynchronous injection valve and the synchronous injection valve are arranged in the height direction of the intake port.

5. An internal combustion engine, comprising:

a cylinder;

an intake port coupled to the cylinder;

one or more intake valves configured to selectively allow and block connection of the intake port to the cylinder;

an asynchronous injection valve configured to inject water into the intake port when the one or more intake valves are closed; and a synchronous injection valve configured to inject water into the intake port when the one or more intake valves are open, wherein the asynchronous injection valve and the synchronous injection valve are configured to have injection characteristics that are different between the asynchronous injection valve and the synchronous injection valve, the asynchronous injection valve includes a nozzle hole, the synchronous injection valve includes a nozzle hole, and the nozzle hole of the asynchronous injection valve is smaller than the nozzle hole of the synchronous injection valve.

6. The internal combustion engine according to claim 5, wherein the asynchronous injection valve is configured to inject water at a lower injection rate than the synchronous injection valve.

7. The internal combustion engine according to claim 5, wherein the intake port has a height direction that extends in a direction in which a piston is operated inside the cylinder, and the asynchronous injection valve and the synchronous injection valve are arranged in the height direction of the intake port.

* * * * *